United States Patent
Norin et al.

(10) Patent No.: US 9,653,800 B2
(45) Date of Patent: May 16, 2017

(54) ROTATION POINTED ANTENNA FOR FIXED WIRELESS WIDE AREA NETWORKS

(71) Applicant: The DIRECTV Group, Inc., El Segundo, CA (US)

(72) Inventors: John L. Norin, Redondo Beach, CA (US); Robert F. Popoli, Rancho Palos Verdes, CA (US); Dipak M. Shah, Westminster, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 0 days.

(21) Appl. No.: 14/858,944

(22) Filed: Sep. 18, 2015

(65) Prior Publication Data
US 2016/0079665 A1 Mar. 17, 2016

Related U.S. Application Data

(60) Division of application No. 13/923,996, filed on Jun. 21, 2013, now Pat. No. 9,160,441, which is a (Continued)

(51) Int. Cl.
*H04H 40/90* (2008.01)
*H01Q 3/06* (2006.01)
(Continued)

(52) U.S. Cl.
CPC ............ *H01Q 3/06* (2013.01); *H01Q 1/1228* (2013.01); *H01Q 3/04* (2013.01); *H01Q 19/12* (2013.01);
(Continued)

(58) Field of Classification Search
CPC ........ H01Q 19/12; H01Q 1/1228; H01Q 1/42; H01Q 3/04; H01Q 3/06; H04B 7/1851;
(Continued)

(56) References Cited

U.S. PATENT DOCUMENTS 3,909,691 A * 9/1975 Wilson .................. H01Q 3/005
200/19.07
5,619,215 A * 4/1997 Sydor ...................... H01Q 3/08
343/765
(Continued)

*Primary Examiner* — Tan H Trinh
(74) *Attorney, Agent, or Firm* — Gates & Cooper LLP

(57) ABSTRACT

An apparatus and method for combining signals received from a direct broadcast satellite system with signals received from a wireless network, includes a satellite antenna for receiving the signals from the direct broadcast satellite system; and a wireless network antenna, co-located with the satellite antenna, for receiving the signals from the wireless network. The wireless network antenna includes an antenna assembly that is rotated by a controller based on characteristics of the signals received from the wireless network. The controller energizes and de-energizes a motor to mechanically rotate the antenna assembly to properly align the wireless network antenna to communicate with the wireless network. The wireless network antenna comprises a closed cylinder, wherein the antenna assembly is rotatably mounted within the closed cylinder, such that, upon command from the controller, the motor engages the antenna assembly to mechanically rotate the antenna assembly about a central axis of the closed cylinder.

24 Claims, 8 Drawing Sheets

Related U.S. Application Data continuation-in-part of application No. 12/797,412, filed on Jun. 9, 2010, now Pat. No. 8,571,464, and a continuation-in-part of application No. 12/797,570, filed on Jun. 9, 2010.

(60) Provisional application No. 61/185,552, filed on Jun. 9, 2009, provisional application No. 61/185,546, filed on Jun. 9, 2009.

(51) Int. Cl.

| | | |
|---|---|---|
| *H04B 7/185* | (2006.01) | |
| *H01Q 19/12* | (2006.01) | |
| *H04N 21/414* | (2011.01) | |
| *H04N 21/442* | (2011.01) | |
| *H04N 21/61* | (2011.01) | |
| *H04N 7/10* | (2006.01) | |
| *H04N 7/20* | (2006.01) | |
| *H01Q 1/12* | (2006.01) | |
| *H01Q 3/04* | (2006.01) | |
| *H01Q 1/42* | (2006.01) | |

(52) U.S. Cl.
CPC ....... *H04B 7/1851* (2013.01); *H04B 7/18528* (2013.01); *H04B 7/18597* (2013.01); *H04N 7/106* (2013.01); *H04N 7/20* (2013.01); *H04N 21/41407* (2013.01); *H04N 21/44209* (2013.01); *H04N 21/6131* (2013.01); *H04N 21/6143* (2013.01); *H01Q 1/42* (2013.01)

(58) Field of Classification Search
CPC ............ H04B 7/18528; H04B 7/18597; H04N 21/41407; H04N 21/44209; H04N 21/6131; H04N 21/6143; H04N 7/106; H04N 7/20
USPC ... 455/3.02, 556.1, 562.1, 575.1, 3.01, 12.1, 455/427, 306, 3.04, 513, 428, 429, 450, 455/430, 13.1, 3.06, 188, 328; 343/881, 343/840, 756, 786; 725/64, 123, 72, 68, 725/63; 318/490, 673, 595; 342/352, 342/356, 367, 383, 711, 755, 380; 709/349; 361/679.4

See application file for complete search history.

(56) References Cited

U.S. PATENT DOCUMENTS

| | | | | |
|---|---|---|---|---|
| 5,982,333 | A * | 11/1999 | Stillinger | H01Q 3/08 342/359 |
| 6,111,542 | A * | 8/2000 | Day | H01Q 3/04 342/359 |
| 6,891,509 | B2 * | 5/2005 | Rose | H01Q 3/005 343/758 |
| 7,043,280 | B1 * | 5/2006 | Shields | H01Q 1/246 343/700 MS |
| 7,705,793 | B2 * | 4/2010 | Kaplan | H01Q 1/3275 343/713 |
| 8,284,115 | B2 * | 10/2012 | Nysen | H01Q 1/22 343/702 |
| 8,427,384 | B2 * | 4/2013 | Clymer | H01Q 1/185 343/753 |
| 8,588,128 | B2 * | 11/2013 | Aguirre | H04W 84/14 370/315 |
| 8,761,663 | B2 * | 6/2014 | Kaplan | H01Q 3/04 342/74 |
| 2005/0068915 | A1 * | 3/2005 | Atad | H04N 21/472 370/316 |
| 2009/0288122 | A1 * | 11/2009 | Zellner | H01Q 9/30 725/64 |
| 2012/0243159 | A1 * | 9/2012 | Aguirre | H04L 12/2834 361/679.4 |
| 2012/0243464 | A1 * | 9/2012 | Aguirre | H04W 84/14 370/316 |

* cited by examiner

ROTATION POINTED ANTENNA FOR FIXED WIRELESS WIDE AREA NETWORKS

CROSS-REFERENCE TO RELATED APPLICATIONS

This application is a continuation-in-part of the following co-pending and commonly-assigned applications:

U.S. Utility application Ser. No. 12/797,412, filed on Jun. 9, 2010, by John L. Norin, entitled "OMNIDIRECTIONAL SWITCHABLE BROADBAND WIRELESS ANTENNA SYSTEM," which application claims the benefit under 35 U.S.C. §119(e) of U.S. Provisional Application Ser. No. 61/185,552, filed on Jun. 9, 2009; and U.S. Utility application Ser. No. 12/797,570, filed on Jun. 9, 2010, by John L. Norin, entitled "INTEGRATED SATELLITE-TV BROADBAND WIRELESS SYSTEM," which application claims the benefit under 35 U.S.C. §119 (e) of U.S. Provisional Application Ser. No. 61/185,546, filed on Jun. 9, 2009;

all of which applications are incorporated by reference herein in their entirety.

BACKGROUND

1. Technical Field

The present specification relates generally to wireless communications systems, and in particular to a directional and steerable broadband wireless antenna system.

2. Description of the Related Art

The use of wireless devices for communication has become commonplace. Numerous wireless networks, e.g., Verizon, Sprint, T-Mobile, AT&T, etc., provide voice, data, video and other communications services via terrestrial based "cellular" services, and other providers, e.g., Intelsat, Iridium, etc., provide wireless services via satellite.

Wireless voice and data services, however, are limited by the ability of the wireless network to communicate where its signals may be blocked or otherwise where there is insufficient signal strength. For example, mobile devices typically have antennas with limited gain, and therefore the antenna on the mobile device cannot transmit enough power or receive enough signal strength to communicate in certain areas.

Other limitations on wireless networks include urban environments with their resultant multi-path interference, rural environments with their lack of network infrastructure, and coverage inside buildings with their signal attenuation that may prevent reception or degrade signals in the wireless network, impacting both coverage and capacity of the wireless network. In particular, limitations of available spectrum for 4G services force the reuse of allocated spectrum, resulting in greater interference levels, thereby affecting the provision of 4G service.

It can be seen, then, that there is a need in the art for improvements in the ability to access wireless networks in various environments, and to increase the capacity and efficiency of wireless networks.

SUMMARY

To minimize the limitations in the prior art, and to minimize other limitations that will become apparent upon reading, the present specification discloses an apparatus and method for combining signals received from a direct broadcast satellite system with signals received from a wireless network, including a satellite antenna for receiving the signals from the direct broadcast satellite system; and a wireless network antenna, optionally co-located with the satellite antenna, for receiving the signals from the wireless network.

In one embodiment, the wireless network antenna includes an antenna assembly that is rotated by a controller based on characteristics of the signals received from the wireless network. The controller energizes and de-energizes a motor to mechanically rotate the antenna assembly to properly align the wireless network antenna to communicate with the wireless network. The wireless network antenna comprises a closed cylinder, and the antenna assembly is rotatably mounted within the closed cylinder, such that, upon command from the controller, the motor engages the antenna assembly to mechanically rotate the antenna assembly about a central axis of the closed cylinder. As a result, the wireless network antenna is omnidirectional during installation, but directional during operation.

The wireless network antenna may be mounted with the satellite antenna, for example, the wireless network antenna may be mounted on an arm that is coupled to a mast of the satellite antenna. Alternatively, the wireless network antenna may be mounted separately from the satellite antenna.

The present specification also discloses an apparatus for communicating with a wireless network, comprising a housing; an antenna assembly mounted within the housing; and a motor that engages the antenna assembly for mechanically orienting the antenna assembly within the housing to communicate with the wireless network.

The housing is a closed cylinder, the antenna assembly is rotatably mounted within the closed cylinder, and the motor mechanically rotates the antenna assembly about a central axis of the closed cylinder.

The antenna assembly is comprised of one or more printed circuit boards (PCBs) implementing an antenna and electronics of a broadband wireless modem device. In one embodiment, both the antenna and the electronics are spun about a center axis of the housing. In another embodiment, only the antenna is spun about a center axis of the housing, and the electronics are mounted on and fixed to a base of the housing.

The motor is attached to a spacing plate of the antenna assembly, the motor's armature serves as a rotation bearing for the antenna assembly, and a rod serves as an upper pivot point, wherein the rod sits in a pilot bushing pressed into the housing.

The motor is energized and de-energized in response to commands from a controller to properly align the antenna assembly to communicate with the wireless network, based on characteristics of signals received from the wireless network, wherein the characteristics of the signals comprise one or more of Received Signal Strength Indicator (RSSI), Reference Signal Received Power (RSRP), Reference Signal Received Quality (RSRQ), Signal-to-Noise Interference Ratio (SINR), bit error rate (BER), and block error/erasure rate (BLER).

Further, there may be a mechanism that prevents over-rotation of the antenna assembly, as well as a link quality indicator, provisioned on the housing or a base for the housing, that provides a visual status of wireless link quality.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and which is shown, by way of illustration, several embodiments. It is understood that other embodiments may be utilized and structural changes may be made without departing from the scope of the present specification.

Overview

The present specification discloses a wireless network antenna for use in deployment of wireless network services. Preferably, the antenna can be rapidly installed without requiring any manual alignment with base stations or antennas of the wireless network, but the antenna later can be operated by mechanically aligning it with the base stations or antennas of the wireless network. Antenna alignment can be accomplished by mechanically rotating a single antenna face, wherein this antenna face would typically have elements for two orthogonal polarizations. It is envisioned that embodiments of the wireless network antenna described herein can offer high reliability and yet have low manufacturing costs.

System Description

Figure 1:
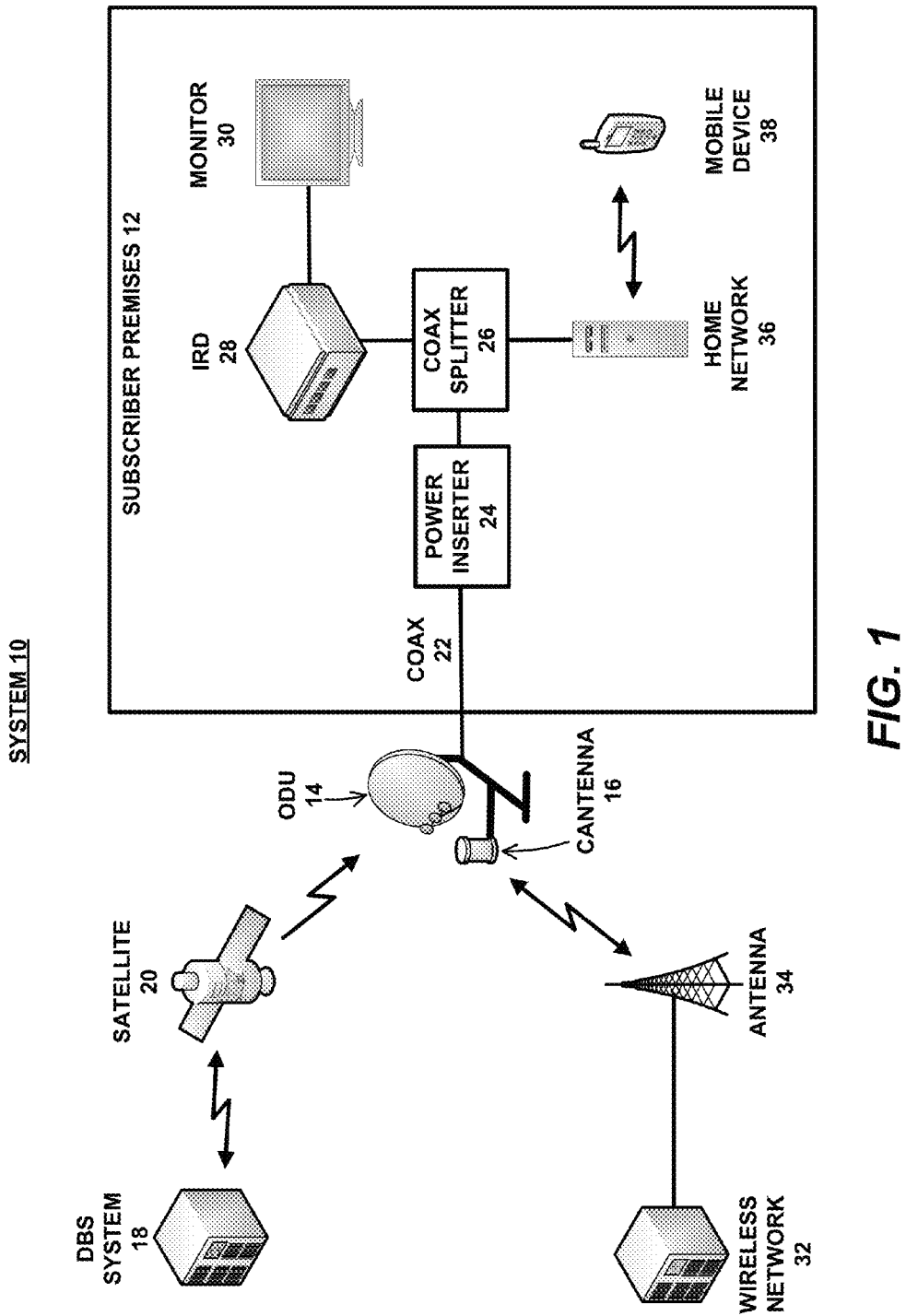
FIG. 1 is a diagram illustrating a system that integrates a satellite antenna and a wireless network antenna at a subscriber's premises, according to one embodiment.

FIG. 1 is a diagram illustrating a system 10 that integrates a satellite antenna and a wireless network antenna at a subscriber's premises 12, according to one embodiment. A satellite antenna known as an Outdoor Unit (ODU) 14 is combined in the same mounting hardware, typically located on the outside of the subscriber's premises 12, with a can-shaped wireless network antenna (also referred to herein as a "cantenna") 16, in order to provide both direct broadcast satellite reception and wireless network reception. In other embodiments, the ODU 14 and the cantenna 16 may be co-located at the subscriber's premises 12, but not combined in the same mounting hardware.

A direct broadcast satellite (DBS) system 18 transmits signals to one or more satellites 20, and the satellites 20 beam the signals to the ODU 14. The ODU 14 receives these signals and sends the received signals, via a coax cable 22, through a power inserter 24 and coax splitter 26, to one or more integrated receivers/decoders (IRDs) 28, also known as set-top boxes (STBs), which decode the signals and separate the signals into viewer channels, which are then passed to monitor 30 for viewing by a user.

A wireless network 32 sends signals to one or more antennas 34, and the antennas 34 transmit the signals to the cantenna 16. The cantenna 16 receives these signals and sends the received signals, via the coax cable 22, through the power inserter 24 and coax splitter 26, to a home network 36, which may comprise one or more devices, such as PCs, routers, etc., and may include a local wireless communications path for use with one or more mobile devices 38.

In one embodiment, the wireless network 32 may comprise a mobile or cellular network that provides wireless voice and/or data, including 3G and 4G networks, although other wireless networks 32 could be used as well. These other wireless networks 32 may comprise wireless broadband networks (such as Wi-Fi or Wi-Max networks), wireless local area networks (LANs), wireless wide area networks (WANs) wireless personal area networks (PANs), wireless metropolitan area networks (MANs), wireless mesh networks, and other wireless networks.

Thus, the system 10 combines signals received from the DBS system 18 with signals received from the wireless network 34, using a satellite antenna 14 for receiving the signals from the DBS system 18, and a wireless network antenna 16, co-located with the satellite antenna 14, for receiving the signals from the wireless network 32.

As the DBS system 18 broadcasts additional services and additional channels to the subscriber's premises 12, viewers will like and expect additional wireless network 32 services to be delivered at reasonable cost in addition to the DBS system 18 services. Similarly, users of the wireless network 32 services will like and expect to have access to the DBS system 18 services. The combination of the ODU 14 and the cantenna 16 provides this capability, and integrates the DBS system 18 services with the wireless network 32 services in a cost effective manner.

Note that either or both the IRDs 28 and the home network 36 may communicate with either or both the DBS system 18 and the wireless network 32. Indeed, the IRDs 28 may communicate with the wireless network 32 to enhance the services received by the IRDs 28 from the DBS system 18. Similarly, the home network 36 may communicate with the DBS system 18 to enhance the services received by the home network 36 from the wireless network 32.

In addition, as noted above, the cantenna 16 provides a means for the wireless network 32 to communicate with the mobile device 38 via the local wireless communications path provided by the home network 36. The mobile device 38 may be served, for example, by a transformation to Wi-Fi or some other format on the local wireless communications path provided by the home network 36.

Alternatively, the cantenna 16 may perform as a low latency repeater or relay for the wireless network 32 to communicate with the mobile device 38 via the local wireless communications path provided by the home network 36. Outdoors, the mobile device 38 may communicate with the antenna 34 directly. Inside the subscriber's premises 12, however, the signal from the antenna 34 may be attenuated to a level that prevents direct communication between the antenna 34 and the mobile device 38. Without the local wireless communications path provided by the home network 36, and the additional gain provided by the cantenna 16, it is possible that a connection would not be present at all between the wireless network 32 and the mobile device 38, or that the connection would not support the data speeds available with the cantenna 16. Note that, as the mobile device 38 moves from inside the subscriber's premises 12 to outside, or vice versa, a handoff may occur between the home network 36 and the antenna 34, while maintaining a communications path with the wireless network 32.

Subscriber Premises Description

Figure 2:
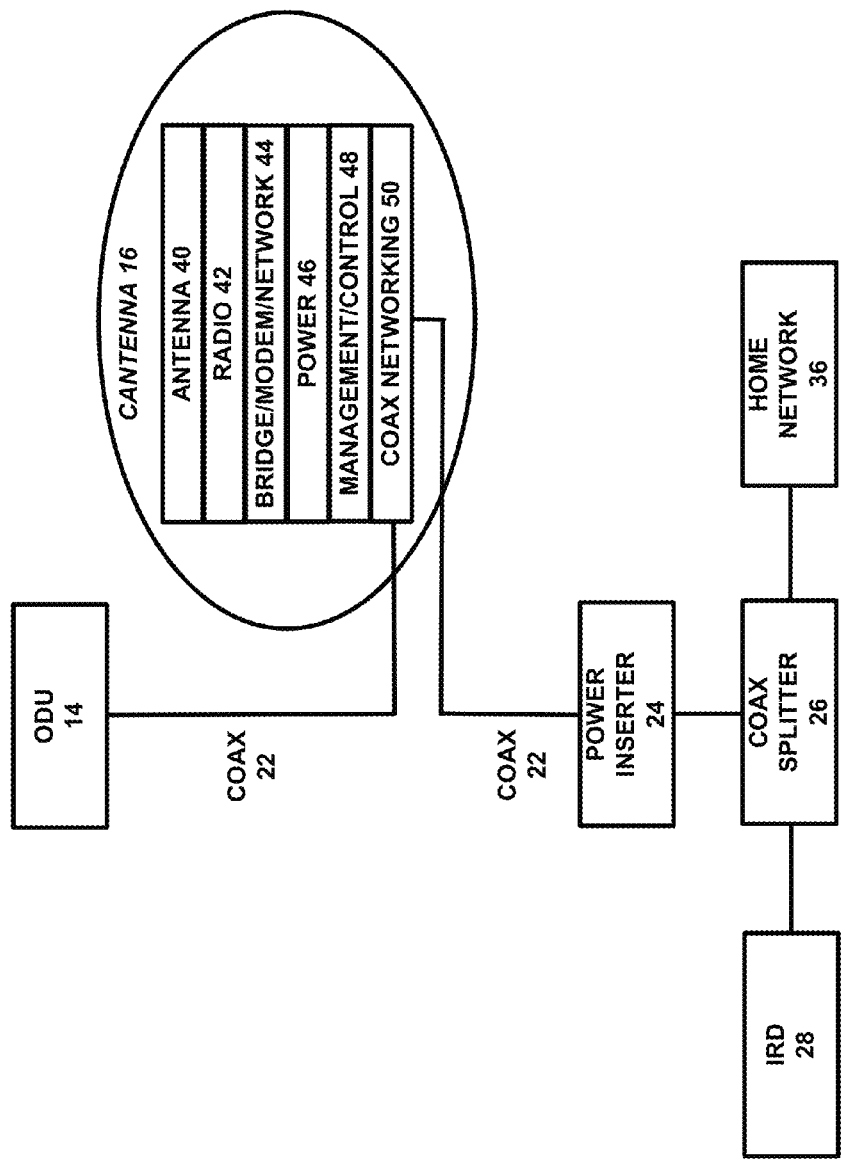
FIG. 2 is a block diagram that further describes the components of a system at the subscriber's premises, according to one embodiment.

FIG. 2 is a block diagram that further describes the components of the system 10 found at the subscriber's premises 12, according to one embodiment.

The ODU 14, which may include a multi-switch (not shown), is coupled via the coax cable 22 with the cantenna 16. The cantenna 16 is coupled via the coax cable 22 with the power inserter 24. Signals from both the ODU 14 and cantenna 16 are routed to the power inserter 24, and then to the coaxial splitter 26, for delivery to the IRDs 28 and/or the home network 36.

Thus, either or both the ODU 14 and cantenna 16 can communicate with either or both the IRDs 28 and the home network 36, using the coax cable 22, in order to operate in conjunction with either or both the DBS system 18 and the wireless network 32. For example, an IRD 28 may be enabled using the cantenna 16 to access the wireless network 32. Similarly, the home network 36 may be enabled using the ODU 14 to access the DBS system 18.

In one embodiment, the cantenna 16 comprises a broadband wireless modem device that includes the following modules: antenna 40, radio 42, bridge/modem/networking 44, power 46, management/control 48 and coax networking 50. Using the modules, the cantenna 16 enables two-way communication services and delivery of signals with the wireless network 32.

The antenna 40 can be of any design, e.g., plate, patch, omnidirectional, phased array, etc., that will enable communications with such networks 32, and can transmit and receive any frequency band as desired.

The radio module 42 is compatible with the antenna 40, and enables the coding and frequency generation compatible with the wireless network 32. The radio module 42 can be designed to be compatible with a single wireless network 32, or to be compatible with multiple different wireless networks 32, as desired.

The bridge/modem/network module 44 is used to combine, modulate, demodulate and distribute signals received from both the wireless network 32 and the DBS system 18, essentially providing an interface that couples the DBS system 18 with the wireless network 32. The bridge/modem/network module 44 typically comprises a bridge or combiner to couple the two signals (wireless and satellite) together at specific frequencies, coding schemes, etc., and to translate these signals into signals that can be used by the IRDs 28 and/or the home network 36 (and other devices as desired). The bridge/modem/network module 44 provides a modem to modulate and demodulate the signals into desired or predetermined modulation schema for use by the various devices 28 and 36 (and other devices as desired). The bridge/modem/network module 44 also allows for networking of these signals for use by the various devices 28 and 36 (and other devices as desired).

The power source module 46 can be a stand-alone power source. In addition, the power source module 46 can derive power from the power inserter 24, or from the IRDs 28, or from the home network 36.

The management/control module 48 is a controller for the cantenna 16, and generally responds to commands related to the wireless network 32, via the antenna 40, IRDs 28 or home network 36. However, commands related to the DBS system 18, received either via the ODU 14, IRDs 28 or home network 36, can be sent and interpreted by the management/control module 48 as well.

The coax networking module 50 handles the interface to the coaxial cable 22. In one embodiment, the coax networking module 50 provides both a coaxial input connector (Sat LNB) for the coax cable 22 from the ODU 14 and a coax output connector (Homerun "F") for the coax cable 22 to the power inserter 24. Both the satellite 20 signals received by the ODU 14 and the antenna 34 signals received by the cantenna 16 are combined onto the single coaxial cable 22 provided to the power inserter 24. The coax networking module 50 uses a frequency band for the wireless network 32 (received by the cantenna 16) that is located apart from the frequency band used by the DBS system 18 (received by the ODU 14). In one embodiment, the frequency band used for the wireless network 32 (received by the cantenna 16) is the DIRECTV Home Network (MoCA) coaxial frequency band, while the frequency band used for the DBS system 18 (received by the ODU 14) is the Satellite "L" band frequency band.

Mounting the Cantenna

Figure 3:
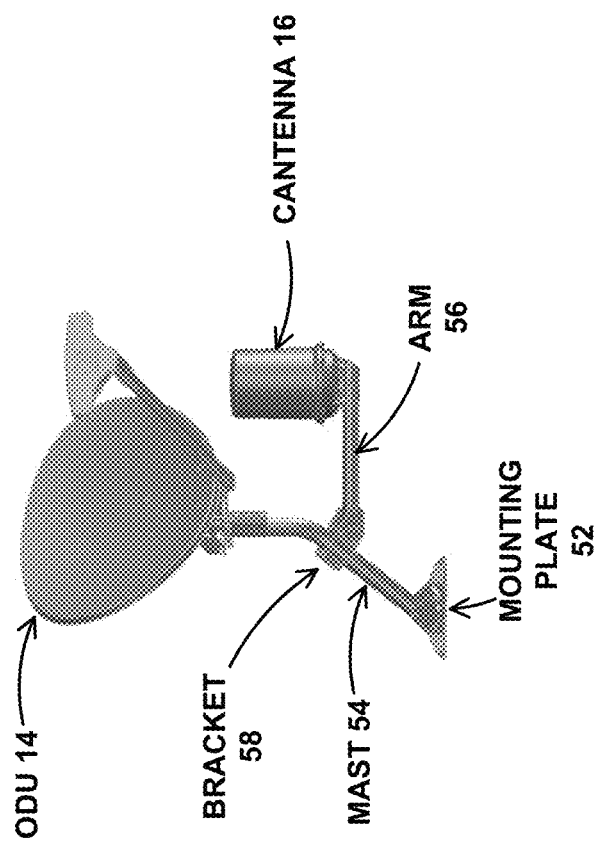
FIG. 3 is an illustration showing how a can-shaped antenna may be mounted on an outdoor unit.

FIG. 3 is an illustration showing how the cantenna 16 is mounted on the ODU 14, according to one possible embodiment.

The ODU 14 typically comprises both a reflector dish and feedhorn assembly to receive and redirect the downlink signals received from the satellite 20. The feedhorn assembly is typically mounted on an arm that attaches to the bottom of the reflector dish, and is comprised of one or more low noise block (LNB) converters that downconvert the downlink signals received from the satellite 20 into frequencies that are easily transmitted by the coax cable 22. The LNBs are connected via coaxial cables to a multi-switch, which can be located within the feedhorn assembly, elsewhere on the ODU 14, or within the subscriber's premises 12. The multi-switch is controlled by the IRDs 28 and/or the home network 36 to couple selected satellite 20 signals onto the coax cable 22 for delivery to the IRDs 28 and/or the home network 36.

The ODU 14 itself is usually mounted to the roof or wall of the subscriber's premises 12 by means of the mounting plate 52, which supports a mast 54 for mounting the ODU 14. This assembly enables alignment of the ODU 14 for reception of the downlink signals from the satellite 20.

In the embodiment shown in FIG. 3, the cantenna 16 is mounted with the ODU 14. Specifically, the cantenna 16 is mounted or supported by an arm 56, which is coupled to the mast 54 of the ODU 14 by a bracket 58. Preferably, the cantenna 16 is positioned such that it does not interfere with the alignment or operation of the ODU 14.

Nonetheless, the cantenna 16 can be mounted in various locations and positions, e.g., on the mast 54, or elsewhere on ODU 14, or separate from ODU 14, as desired or depending on the packaging of the cantenna 16. Further, the cantenna 16 can be mounted stand-alone, i.e., separately from the ODU 14, if desired.

Figure 4A:
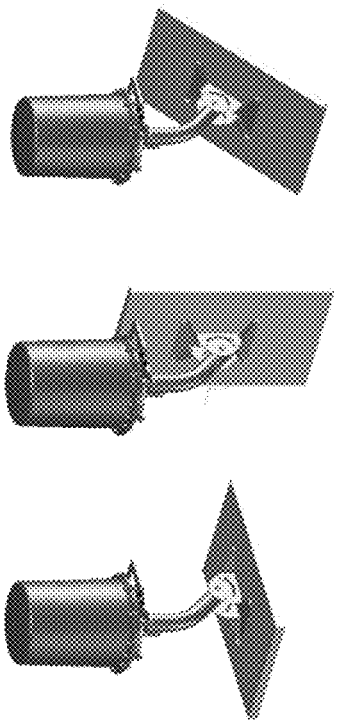
FIGS. 4(*a*) and 4(*b*) are illustrations showing examples of stand-alone mounting for the can-shaped antenna.
Figure 4B:
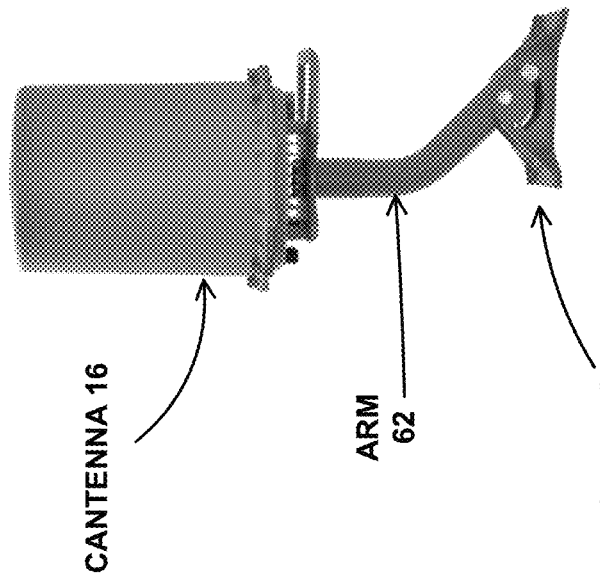

The stand-alone mounting of the cantenna 16 is illustrated in FIGS. 4(a) and 4(b). FIG. 4(a) is an illustration how the cantenna 16 is mounted stand-alone using an alternative mounting plate 60 and an alternative arm 62, as compared to FIG. 3. FIG. 4(b) is an illustration showing various possible orientations for the alternative mounting plate 60 and alternative arm 62, wherein, in each of the various possible orientations, the cantenna 16 can be positioned upright. Even when mounted stand-alone, the cantenna 16 still would be coupled to the ODU 14 by the coax cable 22.

As a result, the cantenna 16 can be quickly installed either on the mast 54 of the ODU 14 or elsewhere on the subscriber's premises 12. Such an approach allows the cantenna 16 to take advantage of one or more key assets that the ODU 14 provides at the subscriber's premises 12, namely, a mount point at the mast 54, power from the coax cable 22 used by the ODU 14, and a communications path into the subscriber's premises 12 as also provided by the coax cable 22. These factors greatly reduce the cost of an outdoor fixed antenna 16 for wireless network 32 reception.

In either instance, co-locating the cantenna 16 with ODU 14 provides for higher gain in the communications path with the antenna 34, the elimination of building penetration loss within the subscriber's premises 12, and the practicality of higher transmit power from a fixed power source. In addition, improved link performance is obtained by positioning the cantenna 16 above the ground, which results in lower propagation losses, and decreases interference from adjacent antennas 34, resulting in a lower interference environment. As a result, there is more efficient use of the spectrum by the wireless network 32.

Further, the improved link budget allows for operation with a higher order modulation format (e.g., 64 QAM instead of QPSK), thereby allowing for higher connection speeds and/or less time resource required on the wireless network 32 to achieve a desired connection speed. This leads to higher efficiency of the wireless network 32, making it feasible to offer residential fixed broadband service over the wireless network 32.

As such, when mounted to the roof or side walls of the subscriber's premises 12, the cantenna 16 can not only extend the useful coverage area of wireless system 32 for that user, it can extend the useful coverage area of wireless system 32 for other users. For example, the cantenna 16 can be used as a relay node of the wireless network 32, wherein a first cantenna 16 mounted on a first subscriber's premises 12 that is a closer distance from the antenna 34 of the wireless network 32 acts as a relay for a second cantenna mounted on a second subscriber's premises 12 that is a further distance from the antenna 34 of the wireless network 32, thus extending the coverage area for the wireless network 32 without the need for additional antennas 34.

Cantenna Components

FIGS. 5(a), 5(b), 5(c) and 5(d) are schematics that illustrate the components of the cantenna 16 in accordance with several embodiments. The components of the cantenna 16 depicted in the schematics include a housing 64, a base 66, a motor 68, spacing plates 70a and 70b, an antenna assembly comprised of one or more printed circuit boards (PCBs) 72, 74 mounted within the housing 64 and implementing the antenna 40 and the electronics 44, 46, 48 and 50 of the broadband wireless modem device, a power and data cable 76, and a link quality indicator 78.

Figure 5A:
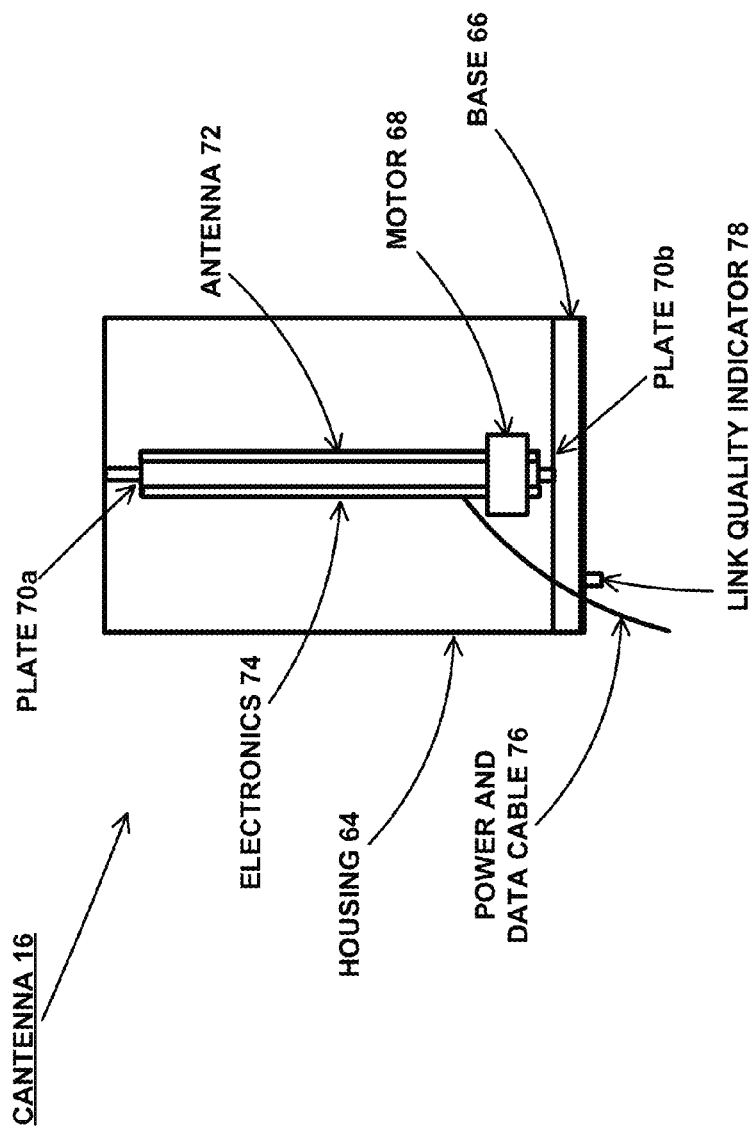
FIGS. 5(*a*), 5(*b*), 5(*c*) and 5(*d*) are schematics that illustrate the components of the can-shaped antenna, according to one or more embodiments.
Figure 5B:
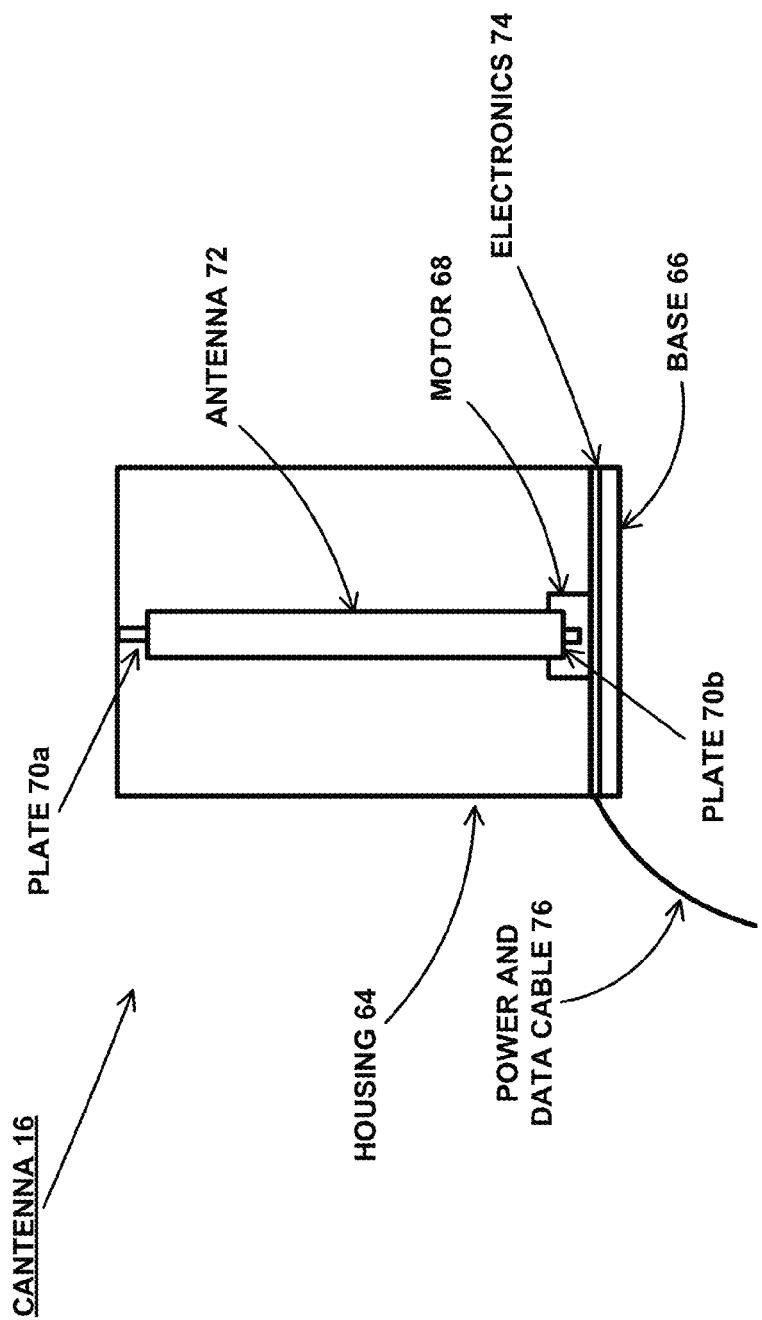
Figure 5C:
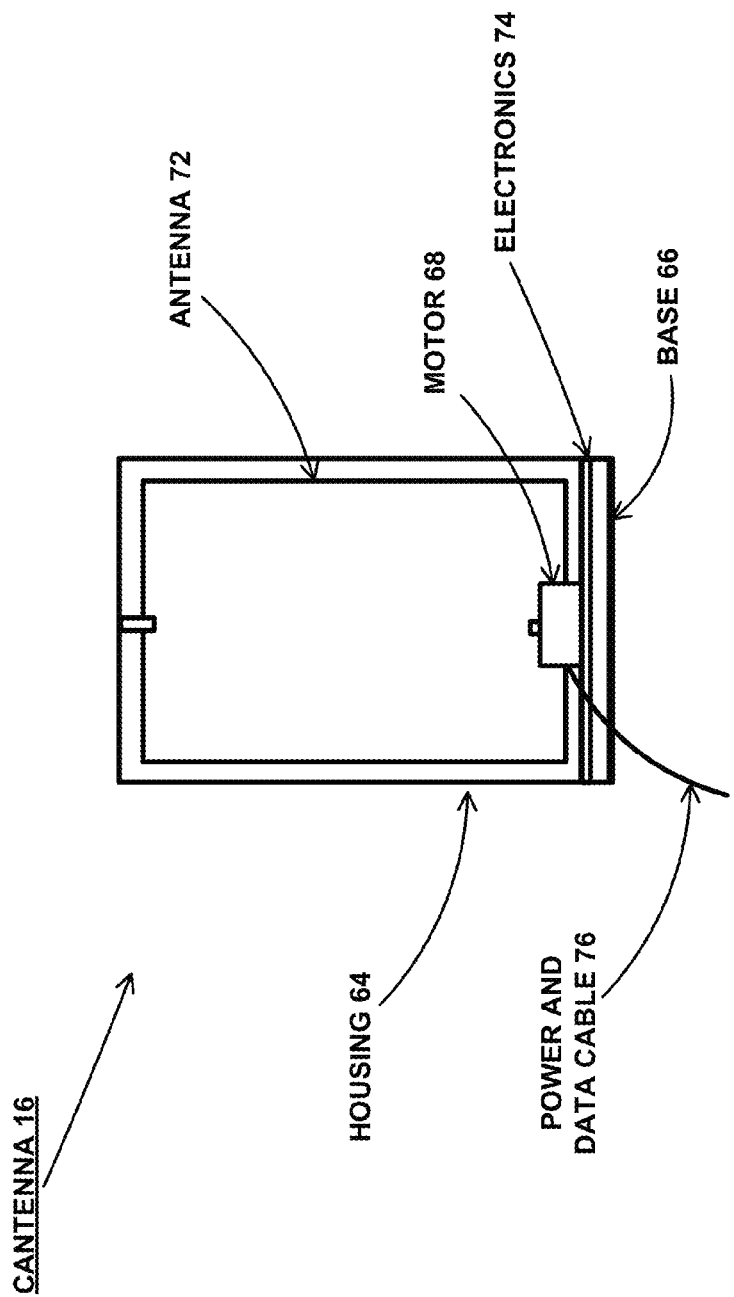
Figure 5D:
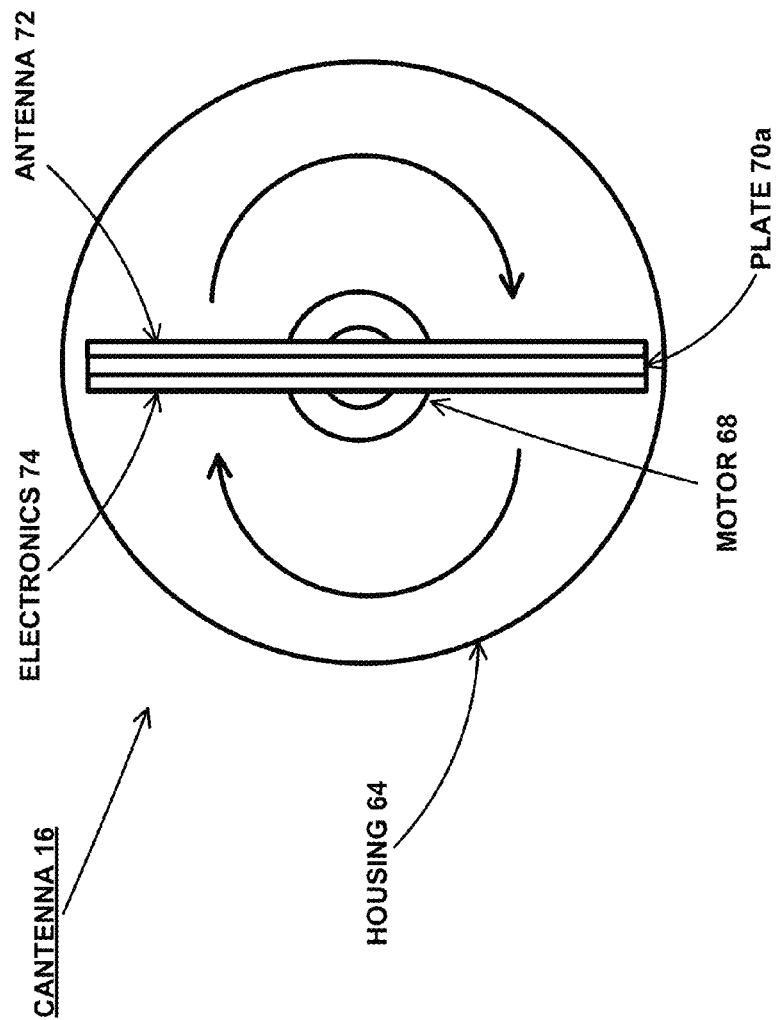

FIG. 5(a) is a cross-section side view of the cantenna 16, according to a first embodiment. As shown, the cantenna 16 is a closed cylinder comprised of the housing 64 mounted on the base 66, the antenna assembly is rotatably mounted within the closed cylinder, and the motor 68 mechanically rotates the antenna assembly about a central axis of the closed cylinder.

The housing 64 is typically transparent to the frequencies of interest being transmitted and received by the antenna 40. In one embodiment, these frequencies are in ranges of the 700, 1900, or 1700/2100 MHz, but can be of any frequency range without departing from the scope of the present specification.

The base 66 is a structural element that supports the other elements of the cantenna 16. Preferably, the base 66 engages with the housing 64 in a manner that encloses all of other components of the cantenna 16 in a weather-proof package As shown in FIG. 5(a), the antenna assembly may be comprised of two PCBs 72 and 74, wherein PCB 72 implements the antenna 40 and PCB 74 implements the electronics 42, 44, 46, 48 and 50. Alternatively, the antenna assembly may be comprised of a single PCB implementing the antenna 40 and the electronics 42, 44, 46, 48 and 50, or more than two PCBs implementing the antenna 40 and the electronics 42, 44, 46, 48 and 50.

One of the advantages of the antenna assembly is that it allows the antenna 40 area to be roughly the cross-sectional area of the housing 64. To achieve this, the PCB 72 implementing the antenna 40 should be close to intersecting a central axis of the "can" comprising the housing 64, which allows it to have the greatest area for a given enclosure size.

Alternatively, the antenna 40 can be of any dimension, and of any design, with one or more elements receiving and transmitting one or more polarizations. For example, the antenna 40 could be implemented as a flat plate, or "patch" style antenna 40, such as a copper panel, rather than a PCB.

In the antenna assembly shown in FIG. 5(a), the two PCBs 72 and 74 are spaced apart by plates 70a and 70b, such that the rotation drive motor 68 can be placed between the PCBs 72 and 74. The antenna assembly is rotated, by action of the motor 68, about the central axis of the housing 64, with low lateral load, and completely contained within the housing 64.

The motor 68 operates in response to commands from the management/control module 48 implemented on the PCB 74. Specifically, the management/control module 48 energizes and de-energizes the motor 68 to mechanically rotate the antenna assembly a specified distance to properly the align the cantenna 16 to communicate with the wireless network 32, based on characteristics of the signals received from the wireless network 32, wherein the characteristics of the signals may comprise one or more of Received Signal Strength Indicator (RSSI), Reference Signal Received Power (RSRP), Reference Signal Received Quality (RSRQ), Signal-to-Noise Interference Ratio (SINR), bit error rate (BER), block error/erasure rate (BLER), etc.

The motor 68 itself is attached to the bottom spacing plate 70b, of the antenna assembly, wherein the motor's 68 armature serves as a bottom rotation bearing for the antenna assembly. The upper spacing plate 70a has a rod that serves as an upper pivot point, wherein the rod sits in a pilot bushing pressed into the housing 64. Alternative embodiments are possible, for example, where the motor 68 is attached to the upper spacing plate 70a, the motor's 68 armature serves as an upper rotation bearing, and the bottom upper spacing plate 70b has a rod that serves as a lower pivot point, wherein the rod sits in a pilot bushing pressed into the housing 64.

Note that other configurations could be used to rotate the antenna assembly as well. For example, the motor 68 can be mounted elsewhere within cantenna 16, and use other mechanisms, such as shafts, gears, bearings, etc., to rotate the plate 70 and with it, the antenna assembly. Any mechanism capable of rotating the antenna assembly may be used.

Moreover, there may be a mechanism, such as a post, slot, pin or stop, or merely the programming of the management/control module 48, that prevents over-rotation of the antenna assembly and damage to the components of the cantenna 16, such as the power and data cable 76. Specifically, the power and data cable 76 is of a finite length, and thus continued rotation of antenna 40 may damage the power and data cable 76, place additional strain on the motor 68, or cause other deleterious effects on the cantenna 16.

The power and data cable 76 connects the components of the cantenna 16 to the other elements of the system, and includes one or more connections to the coax cable 22. Alternatively, the power and data cable 76 could be replaced by one or more wireless connections, or the power and data cable 76 could be replaced by a coaxial slip joint or slip-ring between the stationary base 66 and the rotating antenna assembly.

The link quality indicator 78, which is an optional element, may comprise a single color or multiple color light-emitting diode (LED) that provides a visual status of the wireless link quality, e.g., the characteristics of the signals mentioned above. The link quality indicator 78 may be provisioned on the base 66 or housing 64. The link quality indicator 78 may be electrically connected to and controlled by the management/control module 48.

As noted above, in the first embodiment of FIG. 5(*a*), the motor 68, PCB 72 and PCB 74 are "spun" about the center axis of the housing 64. However, in alternative embodiments, only the PCB antenna 72 may be spun about the center axis of the housing 64, and either or both the PCB 74 and the motor 68 may be fixed. There are advantages to both approaches, but there are definite advantages to the rotating antenna assembly being as light as possible, as compared to having the antenna 40 and electronics 42, 44, 46, 48, 50 mounted together in one sub-module.

FIG. 5(*b*) is a cross-section side view of the cantenna 16, according to a second embodiment. In this embodiment, the modules 42, 44, 46, 48 and 50 are implemented on a single PCB 74 that is mounted on and fixed to the base 66 of the housing 64, wherein only the PCB 72 implementing the antenna 40 is rotated. Similarly, the motor 68 is also mounted on and fixed to the base 66.

FIG. 5(*c*) is a cross-section front view of the cantenna 16, according to the second embodiment. A similar view would exist for the first embodiment, except that the PCB 74 implementing the modules 42, 44, 46, 48, 50 would be hidden, because it would be mounted on the opposite side from the PCB 72 implementing the antenna 40, rather than on the base 66.

FIG. 5(*d*) is a cross-section top view of the cantenna 16, according to the first embodiment. The semicircular arrows within the housing 64, on opposite sides of the rotating antenna assembly comprised of the plate 70a, PCB 72, and PCB 74, are intended to indicate one possible direction of rotation for the antenna assembly within the housing 64.

Cantenna Operation

As noted above, at least the antenna 40 can be rotated by action of the motor 68 as commanded by the management/control module 48. In this regard, the management/control module 48 selects and determines signal characteristics, e.g., Received Signal Strength Indicator (RSSI), Reference Signal Received Power (RSRP). Reference Signal Received Quality (RSRQ), Signal-to-Noise Interference Ratio (SINR), bit error rate (BER), block error/erasure rate (BLER), etc., at the antenna 40, in order to determine whether or not the motor 68 needs to be engaged to rotate the antenna 40 to properly communicate with the antenna 34 of the wireless network 32.

If communications with the antenna 34, or another communications target, requires a different orientation of the antenna 40, the management/control module 48 energizes and de-energizes the motor 68 to rotate the antenna 40 to a proper orientation based on the signal characteristics. Feedback and dithering can be used to determine antenna 40 positioning, wherein the signal characteristics are monitored as the antenna 40 is repeatedly moved, in order to properly align the antenna 40.

For some embodiments of the cantenna 16, multiple signals can be received, which may require that the management/control module 48 determine a "compromise" position, such as a position that determines a best fit operating location for the antenna 40 to transmit and/or receive multiple signals, without maximizing the signal strength or other characteristic of any single signal, whereas at other times, the management/control module 48 may maximize one or more of the signal characteristics to the exclusion of others based on several factors, e.g., priority of transmission, maintenance of one of the signal communications paths, etc. Determination of the position of the antenna 40 may be based on any signal characteristic, whether optimized, maximized, minimized, or otherwise controlled.

For example, the antenna 40 receives a signal, which is analyzed by the management/control module 48 for one or more signal characteristics. To see if the characteristics can be optimized for that particular signal, the management/control module 48 sends a command to the motor 68 to rotate the antenna 40 in a specific direction for a specific distance, e.g., clockwise 5 degrees, and the characteristics of the received signal can be analyzed again to see the change in the characteristics of the received signal. Once the signal characteristics have been optimized, maximized, minimized, or otherwise controlled, by the management/control module 48, the antenna 40 is properly positioned for reception and/or transmission of the signal on that particular wireless communications link.

Although described herein with respect to a single antenna 40, any number of antennas 40 can be used with the cantenna 16. Moreover, the cantenna system 16 can rotate the multiple antennas 40 to different positions independently. Other embodiments may include antennas 40 that rotate in patterns other than circular or axial, e.g., elliptical, arcs, or linear motion. Any combination of movement and number of antennas 40 within the cantenna 16 are envisioned.

Because the management/control module 48 can determine signal characteristics received at the antenna 40, and rotate or move the antenna 40 based on these signal characteristics, the cantenna 16 can be oriented in a variety of directions during and following installation. Indeed, during installation, the cantenna 16 can be pointed in virtually any direction, and later pointed in the desired direction, rather than pointing the cantenna 16 in a particular direction during installation to receive signals from the antenna 34, which would require a more complicated installation procedure for the cantenna 16.

Such installation freedom renders the cantenna 16 as "omnidirectional" during installation, but "directional" during operation, because of the control provided by movement of the antenna 40. For example, since the management/control module 48 can determine which direction the antenna 40 should be pointed at any given time and, through computation, which direction the signals are received, the management/control module 48 can energize and/or de-energize the motor 68 to allow the antenna 40 to receive the signal based on the signal characteristics.

Further, the cantenna 16 can be re-configured following installation should the signal characteristics change. For example, if more antennas 34 are added in the area by the wireless network 32, or if more power is applied by one of the antennas 34 already in the area by the wireless network 32, which may change the direction and/or characteristics of the signals being received by cantenna 16, the antenna 40 can be rotated as necessary to take advantage of these changes. As such, periodically or continuously, the management/control module 48 can re-evaluate the signal characteristics being received by antenna 40 and re-position the antenna 40 by commanding the motor 68 to rotate the antenna 40 as necessary. No physical re-alignment of the cantenna 16, or re-installation of the cantenna 16, would typically be required, because the management/control module 48 re-configures the antenna 40 by moving the antenna 40 to "point" at one or more of the antennas 34 of the wireless network 32.

Advantages of the Cantenna

The cantenna 16 provides a number of advantages over related approaches. For example, phased array elements and control systems to create phased array beams allow for omnidirectional placement of phased array antennas in a manner similar to that used for the cantenna 16. However, such phased array elements and control systems are expensive to produce and maintain.

On the other hand, the cantenna 16 is relatively inexpensive to produce and maintain, and yet still provides for omnidirectional placement during installation. Moreover, the cantenna 16 is directional during operation, as a result of mechanically rotating the antenna 40.

The cantenna 16 further offers higher reliability, lower manufacturing and development costs, and improved wireless network 32 access for both new and pre-existing ODU 14 installations for DBS systems 18. The cantenna 16 also places fairly benign requirements on the signal and power connections provided by ODU 14.

CONCLUSION

The foregoing description of one or more embodiments has been presented for the purposes of illustration and description. It is not intended to be exhaustive or to limit the specification to the precise form disclosed. Many modifications and variations are possible in light of the above teaching, without fundamentally deviating from the essence of the present specification.

What is claimed is:

1. An apparatus for communicating with a wireless network, comprising:
 a wireless network antenna that receives signals from the wireless network and sends signals to the wireless network;
 wherein the wireless network antenna includes a housing that is a closed cylinder, an antenna assembly mounted within the housing, and a motor that engages the antenna assembly for mechanically orienting the antenna assembly within the housing to communicate with the wireless network; and
 wherein the signals of the wireless network antenna are communicated with a home network using a single coax cable that is shared with signals from a satellite antenna that are received from a direct broadcast satellite system and communicated with a receiver/decoder of the direct broadcast satellite system.

2. The apparatus of claim 1, wherein the antenna assembly is rotatably mounted within the closed cylinder, and the motor mechanically rotates the antenna assembly about a central axis of the closed cylinder.

3. The apparatus of claim 1, wherein the antenna assembly is comprised of one or more printed circuit boards (PCBs) implementing an antenna and electronics of a broadband wireless modem device, and both the antenna and the electronics are spun about a center axis of the housing.

4. The apparatus of claim 1, wherein the antenna assembly is comprised of one or more printed circuit boards (PCBs) implementing an antenna and electronics of a broadband wireless modem device, only the antenna is spun about a center axis of the housing, and the electronics are mounted on and fixed to a base of the housing.

5. The apparatus of claim 1, wherein the motor is attached to a spacing plate of the antenna assembly, the motor's armature serves as a rotation bearing for the antenna assembly, and a rod serves as an upper pivot point, wherein the rod sits in a pilot bushing pressed into the housing.

6. The apparatus of claim 1, wherein the motor is energized and de-energized in response to commands from a controller to properly align the antenna assembly to communicate with the wireless network, based on characteristics of signals received from the wireless network, wherein the characteristics of the signals comprise one or more of Received Signal Strength Indicator (RSSI), Reference Signal Received Power (RSRP), Reference Signal Received Quality (RSRQ), Signal-to-Noise Interference Ratio (SINR), bit error rate (BER), and block error/erasure rate (BLER).

7. The apparatus of claim 1, further comprising a mechanism that prevents over-rotation of the antenna assembly.

8. The apparatus of claim 1, further comprising a link quality indicator, provisioned on the housing or a base for the housing, that provides a visual status of wireless link quality.

9. The apparatus of claim 1, wherein the wireless network antenna and the satellite antenna communicate with either or both the home network for the wireless network and the receiver/decoder of the direct broadcast satellite system using the single coax cable.

10. The apparatus of claim 1, wherein the wireless network antenna is co-located with the satellite antenna that receives signals from the direct broadcast satellite system.

11. The apparatus of claim 10, wherein the wireless network antenna is mounted on an arm that is coupled to a mast of the satellite antenna.

12. The apparatus of claim 1, wherein the wireless network antenna is mounted separately from the satellite antenna.

13. A method of communicating with a wireless network, comprising:
 receiving signals from the wireless network and sending signals to the wireless network using a wireless network antenna;
 wherein the wireless network antenna includes a housing that is a closed cylinder, an antenna assembly mounted within the housing, and a motor that engages the antenna assembly for mechanically orienting the antenna assembly within the housing to communicate with the wireless network; and
 wherein the signals of the wireless network antenna are communicated with a home network using a single coax cable that is shared with signals from a satellite antenna that are received from a direct broadcast satellite system and communicated with a receiver/decoder of the direct broadcast satellite system.

14. The method of claim 13, wherein the antenna assembly is rotatably mounted within the closed cylinder, and the motor mechanically rotates the antenna assembly about a central axis of the closed cylinder.

15. The method of claim 13, wherein the antenna assembly is comprised of one or more printed circuit boards (PCBs) implementing an antenna and electronics of a broadband wireless modem device, and both the antenna and the electronics are spun about a center axis of the housing.

16. The method of claim 13, wherein the antenna assembly is comprised of one or more printed circuit boards (PCBs) implementing an antenna and electronics of a broadband wireless modem device, only the antenna is spun about a center axis of the housing, and the electronics are mounted on and fixed to a base of the housing.

17. The method of claim 13, wherein the motor is attached to a spacing plate of the antenna assembly, the motor's armature serves as a rotation bearing for the antenna assembly, and a rod serves as an upper pivot point, wherein the rod sits in a pilot bushing pressed into the housing.

18. The method of claim 13, wherein the motor is energized and de-energized in response to commands from a controller to properly align the antenna assembly to communicate with the wireless network, based on characteristics of signals received from the wireless network, wherein the characteristics of the signals comprise one or more of Received Signal Strength Indicator (RSSI), Reference Signal Received Power (RSRP), Reference Signal Received Quality (RSRQ), Signal-to-Noise Interference Ratio (SINR), bit error rate (BER), and block error/erasure rate (BLER).

19. The method of claim 13, further comprising preventing over-rotation of the antenna assembly.

20. The method of claim 13, further comprising providing a visual status of wireless link quality using a link quality indicator provisioned on the housing or a base for the housing.

21. The method of claim 13, wherein the wireless network antenna and the satellite antenna communicate with either or both the home network and the receiver/decoder of the direct broadcast satellite system using the single coax cable.

22. The method of claim 13, wherein the wireless network antenna is co-located with the satellite antenna that receives signals from the direct broadcast satellite system.

23. The method of claim 22, wherein the wireless network antenna is mounted on an arm that is coupled to a mast of the satellite antenna.

24. The method of claim 13, wherein the wireless network antenna is mounted separately from the satellite antenna.

* * * * *